J. AUBLE & A. D. WEISS.

LAWN SPRAYER.

No. 11,583. Reissued Jan. 5, 1897.

Witnesses

J. G. Hinkel

William E. Neff

Inventors

John Auble

Ackless D. Weiss

Watson & Watson, Attorneys

UNITED STATES PATENT OFFICE.

JOHN AUBLE, OF NEW YORK, N. Y., AND ARKLESS D. WEISS, OF WILKES-BARRÉ, PENNSYLVANIA, ASSIGNORS TO RALPH W. LEE AND JAMES A. WATSON, OF WASHINGTON, DISTRICT OF COLUMBIA.

LAWN-SPRAYER.

SPECIFICATION forming part of Reissued Letters Patent No. 11,583, dated January 5, 1897.

Original No. 558,891, dated April 21, 1896. Application for reissue filed November 6, 1896. Serial No. 611,296.

*To all whom it may concern:*

Be it known that we, JOHN AUBLE, residing at New York, in the county and State of New York, and ARKLESS D. WEISS, residing at Wilkes-Barré, in the county of Luzerne and State of Pennsylvania, citizens of the United States, have invented certain new and useful Improvements in Lawn-Sprayers, of which the following is a specification.

Our invention relates to lawn-sprinklers; and it consists in a novel device for distributing water in the form of spray upon lawns or gardens and generally for spraying or spreading liquids for any purpose.

Figure 1:
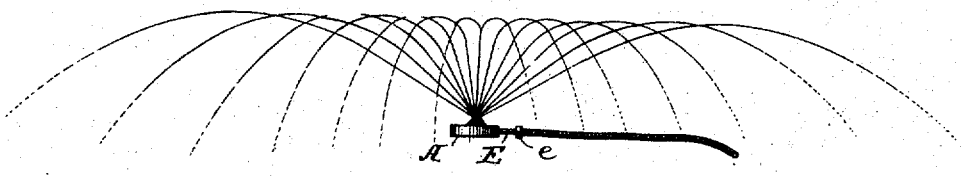
Figure 2:
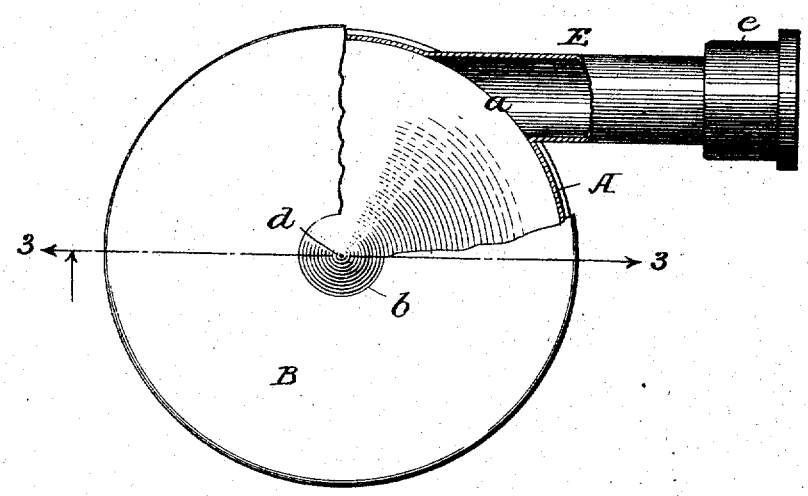
Figure 3:
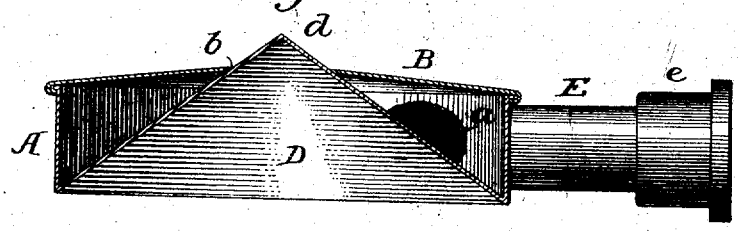
Figure 4:
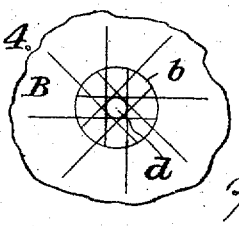

In the accompanying drawings, which form a part of this specification, Figure 1 shows the sprayer in operation. Fig. 2 is a plan view, part of the top being broken away to show the interior. Fig. 3 is a section on the line 3 3 of Fig. 2, and Fig. 4 is a diagram showing the mode of operation of our invention.

Our sprayer consists, as shown, of a circular casing having an annular side wall A, with a tangential opening *a* therein, a circular substantially flat top plate B, having a central circular opening *b*, and a cone-shaped bottom plate D, having its base attached to the lower edge of the side wall A and its apex *d* protruding through the opening *b* in the top and partially or nearly filling said opening. A tangential tube E may be attached to the casing in line with the opening *a* and provided with a hose-coupling *e*.

The operation of our invention is as follows: Water under pressure being admitted through the opening *a* into the annular chamber surrounding the cone, it circulates with increasing rapidity toward the central discharge-opening *b*. If the cone were removed, this water would tend to fly off horizontally and tangentially from the opening *b*. With the cone present, as shown in the drawings, the water would all be projected toward its apex if there were no rotary movement in the casing. The real action of the water is in the direction of the resultant of these two forces—that is, the cone gives it an upward direction and the rotation spreads it horizontally, thus producing the effect shown in Fig. 1. The substantially flat top plate directs the water against the surface of the cone as it issues from the orifice. The volume of water and the extent of space covered will depend upon the pressure and the width of the annular opening from which the water issues.

The essential features of the invention are that the chamber within the casing shall be circular or annular, that the inlet shall be so arranged as to give the water a rotary or whirling movement in said chamber, that there shall be a circular opening in the top or upper end of the casing, and that there shall be a tapering or cone-shaped body centrally arranged in the opening and nearly filling said opening, the base of the cone being below and larger than the opening. The upper wall of the chamber and the conical surface should converge toward the annular outlet-opening and thereby impart a high velocity to the ejected water, and the speed of rotation should be such as to throw the water away from the center of the cone by centrifugal force sufficiently to prevent the spray upon opposite sides of the cone from meeting or interfering. The proper action is illustrated in Fig. 4. The angle of elevation at which the water is discharged depends upon the angle of the cone and the speed of rotation. It will increase as the sides of the cone become steeper and decrease as the speed of rotation increases. By properly proportioning the various parts any desired angle of elevation may be secured. As shown in Fig. 4, the water leaves the cone before reaching the apex thereof, and hence the cone may be truncated more or less, if desired, the apex portion being unessential.

The sprayer is preferably made of sheet metal stamped into shape and united by suitable joints. It may, if desired, be made of cast metal. It will be evident that the spraying effect is produced by the cone projecting through the top with an annular opening between. The cone might be separate from the bottom and either hollow or solid, and the top might be convex or concave without destroying the effect of the combination. We therefore do not care to limit ourselves to the precise construction and arrangement of parts shown and described.

What we claim is—

1. In a sprinkler, a casing inclosing a circular chamber, said chamber having an inlet arranged to impart a rotary movement to the water within the chamber, and an annular outlet, said outlet being formed by a circular opening in the top of the casing and a cone-shaped body centrally arranged in and nearly filling said opening, the portion of said cone-shaped body below the opening being larger than and tapering toward said opening, substantially as described.

2. In a sprinkler, a casing inclosing a circular chamber, a central circular opening in the top of said chamber, a cone-shaped body centrally located in and tapering toward said opening, the portion of the cone below the opening being of greater diameter than said opening and the smaller end of the cone projecting through and nearly filling said opening, whereby an annular outlet to the chamber is formed, and an inlet to said chamber arranged to impart a rotary movement to the water contained therein, substantially as described.

3. In a lawn-sprinkler, a casing having an annular wall, a closed bottom, a substantially flat top plate having a central circular opening, a cone-shaped body within the circular wall of the casing and having its apex projecting above and nearly filling said circular opening, and an opening in the circular wall arranged to admit water tangentially to the annular chamber surrounding the cone, substantially as described.

4. A lawn-sprinkler consisting of a casing having an annular wall with a tangential opening therein, a substantially flat top plate having a central circular opening, and a cone-shaped bottom plate arranged with the apex of the cone protruding from and nearly filling the circular opening of the top plate, substantially as described.

In testimony whereof we affix our signatures in presence of two witnesses.

JOHN AUBLE.
ARKLESS D. WEISS.

Witnesses as to John Auble:
MAURICE BLOCK,
M. L. GAFFNEY.

Witnesses as to Arkless D. Weiss:
W. L. RAEDER,
M. J. MULHALL.